(12) United States Patent
Chen et al.

(10) Patent No.: US 10,013,496 B2
(45) Date of Patent: Jul. 3, 2018

(54) INDEXING ACTIONS FOR RESOURCES

(71) Applicant: GOOGLE LLC, Mountain View, CA (US)

(72) Inventors: Steve Chen, Santa Clara, CA (US); Jason B. Douglas, San Francisco, CA (US); Samuel Shoji Fukujima Goto, Mountain View, CA (US)

(73) Assignee: Google LLC, Mountain View, CA (US)

( * ) Notice: Subject to any disclaimer, the term of this patent is extended or adjusted under 35 U.S.C. 154(b) by 282 days.

(21) Appl. No.: 14/742,857

(22) Filed: Jun. 18, 2015

(65) Prior Publication Data

US 2015/0370810 A1    Dec. 24, 2015

Related U.S. Application Data

(60) Provisional application No. 62/016,469, filed on Jun. 24, 2014.

(51) Int. Cl.
*G06F 17/30* (2006.01)
*H04L 29/08* (2006.01)

(52) U.S. Cl.
CPC ...... *G06F 17/3087* (2013.01); *G06F 17/3053* (2013.01); *G06F 17/30864* (2013.01); *H04L 67/02* (2013.01); *H04L 67/10* (2013.01)

(58) Field of Classification Search
CPC combination set(s) only.
See application file for complete search history.

(56) References Cited

U.S. PATENT DOCUMENTS

| 7,474,740 | B1 * | 1/2009 | Smith | H04M 3/4938 340/13.26 |
|---|---|---|---|---|
| 7,505,938 | B2 * | 3/2009 | Lang | G06Q 30/06 370/229 |
| 7,617,225 | B2 | 11/2009 | Arrouye et al. | |

(Continued)

FOREIGN PATENT DOCUMENTS

| EP | 1862922 | 12/2007 |
|---|---|---|
| EP | 2474905 | 7/2012 |

(Continued)

OTHER PUBLICATIONS

International Preliminary Report on Patentability issued in International Application No. PCT/US2015/037207, dated Jan. 5, 2017, 7 pages.

(Continued)

*Primary Examiner* — Etienne Leroux
(74) *Attorney, Agent, or Firm* — Fish & Richardson P.C.

(57) ABSTRACT

Methods, systems, and apparatus, including computer programs encoded on a computer storage medium, for indexing actions for resources. In an aspect, a method receiving, for each resource a plurality of resources that are each accessible by a user device, action data describing actions supported by each resource, each action being an action that can be performed by the user device processing the resource; for each resource: determining, from the action data, an action type for each action supported by the resource, determining, from the action data, action parameters for each action supported by the resource, and indexing the action data, action types and action parameters for the resource in an index that is searchable by a search engine.

21 Claims, 4 Drawing Sheets

(56) References Cited

U.S. PATENT DOCUMENTS

| | | | |
|---|---|---|---|
| 7,716,223 B2 | 5/2010 | Haveliwala et al. | |
| 7,761,448 B2 | 7/2010 | Meyerzon et al. | |
| 8,086,957 B2 | 12/2011 | Bauchot | |
| 8,458,384 B2 | 6/2013 | Johnson | |
| 8,510,648 B2 | 8/2013 | Harman et al. | |
| 8,510,764 B1 | 8/2013 | Deselaers | |
| 8,515,979 B2 | 8/2013 | Mehta | |
| 8,527,874 B2 | 9/2013 | Friedman | |
| 8,554,345 B2 | 10/2013 | Fernandez | |
| 8,566,173 B2 | 10/2013 | Mahaniok | |
| 8,583,632 B2 | 11/2013 | Libes et al. | |
| 8,595,450 B2 | 11/2013 | Nguyen et al. | |
| 8,645,362 B1 | 2/2014 | Jain et al. | |
| 8,745,108 B2 | 6/2014 | Jansson | |
| 9,275,054 B2 | 3/2016 | Paul et al. | |
| 2003/0028419 A1* | 2/2003 | Monaghan | G06Q 10/06 705/7.12 |
| 2004/0030882 A1 | 2/2004 | Forman | |
| 2005/0114185 A1* | 5/2005 | Rodriguez | G06Q 10/02 705/5 |
| 2005/0177562 A1 | 8/2005 | Raciborski | |
| 2005/0256737 A1* | 11/2005 | Liu | G06Q 10/109 705/2 |
| 2006/0218043 A1* | 9/2006 | Rosenzweig | G06Q 30/0603 705/15 |
| 2006/0242138 A1 | 10/2006 | Brill et al. | |
| 2007/0192300 A1 | 8/2007 | Reuther | |
| 2007/0209080 A1 | 9/2007 | Ture | |
| 2007/0282879 A1 | 12/2007 | Degenkolb et al. | |
| 2007/0288696 A1* | 12/2007 | Repasi | G06F 21/51 711/135 |
| 2008/0313190 A1 | 12/2008 | Cheng et al. | |
| 2009/0150363 A1 | 6/2009 | Gross et al. | |
| 2010/0082661 A1 | 4/2010 | Beaudreau | |
| 2010/0185612 A1 | 7/2010 | Kelly et al. | |
| 2010/0257466 A1 | 10/2010 | Wroblewski et al. | |
| 2010/0306191 A1 | 12/2010 | LeBeau et al. | |
| 2011/0252038 A1 | 10/2011 | Schmidt | |
| 2011/0307463 A1 | 12/2011 | Kasterstein et al. | |
| 2011/0314004 A1 | 12/2011 | Mehta | |
| 2012/0124061 A1 | 5/2012 | Macbeth et al. | |
| 2012/0124062 A1 | 5/2012 | Macbeth | |
| 2012/0144281 A1* | 6/2012 | Schechter | G06F 17/30867 715/205 |
| 2012/0158685 A1 | 6/2012 | White et al. | |
| 2012/0179706 A1 | 7/2012 | Hobbs | |
| 2012/0179955 A1 | 7/2012 | French | |
| 2012/0221724 A1 | 8/2012 | Chor | |
| 2012/0254776 A1 | 10/2012 | Corella et al. | |
| 2012/0284256 A1 | 11/2012 | Mahajan | |
| 2012/0290441 A1 | 11/2012 | Mahaniok | |
| 2012/0290584 A1 | 11/2012 | De Bona et al. | |
| 2012/0296679 A1* | 11/2012 | Im | G06Q 10/02 705/5 |
| 2012/0316955 A1 | 12/2012 | Panguluri et al. | |
| 2012/0323898 A1 | 12/2012 | Kumar et al. | |
| 2013/0006897 A1 | 1/2013 | Jain et al. | |
| 2013/0047149 A1 | 2/2013 | Xu et al. | |
| 2013/0054698 A1 | 2/2013 | Lee | |
| 2013/0110815 A1 | 5/2013 | Tankovich | |
| 2013/0111328 A1 | 5/2013 | Khanna | |
| 2013/0122861 A1 | 5/2013 | Kim et al. | |
| 2013/0124322 A1* | 5/2013 | Boland | G06Q 30/0255 705/14.58 |
| 2013/0124606 A1 | 5/2013 | Carpenter et al. | |
| 2013/0191360 A1 | 7/2013 | Burkard et al. | |
| 2013/0232256 A1 | 9/2013 | Lee et al. | |
| 2013/0246415 A1 | 9/2013 | Davis | |
| 2013/0298007 A1 | 11/2013 | Cullen | |
| 2013/0311458 A1 | 11/2013 | Goel et al. | |
| 2013/0325856 A1 | 12/2013 | Soto Matamala et al. | |
| 2014/0019958 A1 | 1/2014 | Sherman | |
| 2014/0108913 A1 | 4/2014 | Bourke et al. | |
| 2014/0115479 A1 | 4/2014 | Wang et al. | |
| 2014/0172412 A1 | 6/2014 | Viegas et al. | |
| 2014/0173625 A1 | 6/2014 | Kumar et al. | |
| 2014/0214461 A1 | 7/2014 | Diliberto | |
| 2014/0297455 A1 | 10/2014 | Zhao | |
| 2014/0358916 A1 | 12/2014 | Anand | |
| 2015/0347585 A1 | 12/2015 | Klotz | |

FOREIGN PATENT DOCUMENTS

| | | |
|---|---|---|
| EP | 2495670 | 9/2012 |
| JP | 2004-517402 | 6/2004 |
| WO | 2002/052441 | 7/2002 |
| WO | 2014088636 | 6/2014 |

OTHER PUBLICATIONS

International Search Report and Written Opinion in International Application No. PCT/US2015/037207, dated Sep. 8, 2015, 9 pages.

International Search Report and Written Opinion in International Application No. PCT/US2015/035066, dated Jul. 30, 2015, 12 pages.

"About Rich Snippets and Structure Data," Webmaster Tools Help, downloaded from the Internet on May 13, 2014, 3 pages https://support.google.com/webmasters/answer/99170?hl=en.

"Google Play Music and Google Now . . . a way to get them to play nice?" Android Forums at And . . . , downloaded from the internet on May 13, 2014, 12 pages, http://forums.androidcentral.com/google-nexus-5/332074-google-play-music-google-now-way-.

"Google Search for Song, Music Pays Automatically, Won't Turn Off?", Google Product Forms, downloaded from the internet on May 13, 2014, 2 pages, https://productforums.google.com/forum/#!topic/chrome/RiorLWnD4tg.

"MySpace Still Rules Good Search Results for Music Acts," MIT Music Think Tank, downloaded from the internet on Mar. 13, 2014, 3 pages, http://www.musicthinktank.com/blog/myspace-still-rules-google-search-results-for-music-acts.html.

"Songs Playing Automatically," The Spotify Community, downloaded from the internet on May 13, 2014, 2 pages, https://community.spotify.com/t5/Help-Desktop-Linux-Mac-and-Songs-p . . . .

Bavor, Jr., Clayton W. et al., U.S. Appl. No. 11/775,684, filed Jul. 10, 2007 for "Landing Page Score," 38 pages.

Ruxanda, M.M. et al., "Ranking Music Data by Relevance and Importance," Proceedings of the IEEE International Conference on Multimedia and Expo (ICME'08), 2008, 4 pages.

"Thing > Action," Schema.org, downloaded from the internet on Jun. 12, 2014, 3 pages, http://schema.org/Action.

International Search Report and Written Opinion in International Application No. PCT/US2014/011256, dated Apr. 15, 2014, 12 pages.

"Adding deep linking to Google+ posts shared from your iOS app," [online][Retrieved on Jan. 7, 2014]; Retrieved from the Internet URL: https://developers.google.com/+/mobile/ios/share/deep-link; 3 pages.

"App Linking," [online][Retrieved on Jan. 7, 2014]; Retrieved from the Internet URL: https://developers.facebook.com/docs/android/link-to-your-native-app/; 14 pages.

"Class Gecko View Content," [online][Retrieved on Jan. 2, 2014]; Retrieved from the Internet URL: people.mozilla.org/~mfinkle/geckoview/docs/org/Mozilla/gecko/GeckoViewContent.html; 4 pages.

"Deeplink.me Lets Mobile Users Navigate Through A "Web" of Apps," [online][Retrieved on Dec. 13, 2013]; Retrieved from the Internet URL: techcrunch.com/2013/05/22new-service-called-deeplink-me-will-let-mobile-users-navigate-through-a-web-of-apps/; 8 pages.

"Frequently Asked Questions—General Information," [online][Retrieved on Jan. 7, 2014]; Retrieved from the Internet URL: https://linksmanager.com/Frequently+Asked+Questions+-+General+Information; 8 pages.

"Google's Search Results Can Deep-Link to Your Android Apps," [online] [Retrieved on Dec. 13, 2013]; Retrieved from the Internet URL: techcrunch.com/2013/10/31/android-4-4-kitkat-app-index-ing/; 6 pages.

(56) References Cited

OTHER PUBLICATIONS

"How to determine when an application is fully launched?" [online][Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.
"How to get a deep link of my application from the Windows Phone Marketplace using .NET code?," [online] [Retrieved on Dec. 13, 2013]; Retrieved from the Internet URL: stackoverflow.com/questions/13639564/how-to-get-a-deep-link-of-my-application-from-the-windows-phone-marketplace-usin; 2 pages.
"Indexing apps just like websites," [online] [Retrieved on Dec. 13, 2013]; Retrieved from the Internet URL: googlewebmastercentral.blogspot.com/2013/10/indexing-apps-just-like-websites.html; 4 pages.
"Instant Pages on Google Chrome," [online] [Retrieved on Dec. 16, 2013]; Retrieved from the Internet URL: chrome.blogspot.jp/2011/instant-pages-on-google-chrome.html; 3 pages.
"Mobile deep linking," [online] [Retrieved on Dec. 13, 2013]; Retrieved from the Internet URL: en.wikipedia.org/wiki/Mobile_deep_linking; 2 pages.
"NSApplication Class Reference," [online][Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.
"Ready for A "Web" of Apps? Quixey Launches AppURL, A New Way to Enable Deep Linking Across Mobile Applications," [online] [Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.
"Seven Tips for Supercharging Your Links," [online][Retrieved on Jan. 7, 2014]; Retrieved from the Internet URL: goarticles.com/article/Seven-Tips-For-Supercharging-Your-Links/3056299/; 5 pages.
"Sharing to Google+ from your Android app," [online][Retrieved on Jan. 7, 2014]; Retrieved from the Internet URL: https://developers.google.com/+/mobile/android/share/#handling_incoming_deep_links; 2 pages.
"Visability for Your Apps/Android Developers" Developer.Andriod.com [online]. [Retrieved on Mar. 11, 2013]. Retrieved from the Internet: <URL: http://developer.android.com/distribute/googleplay/about/visibility.html>, 6 pages.
Google Play Store [online]. [Retrieved on Mar. 11, 2013]. Retrieved from the Internet: <URL: https://play.google.com/store>, 3 pages.
Klais, "5 SEO Tips to Get Mobile Apps Ranked in SERPs," Search Engine Land [online], Dec. 19, 2011 [retrieved on Mar. 11, 2013]. Retrieved from the Internet: <URL: http://searchengineland.com/5-seo-tips-to-get-mobile-apps-ranked-in-serps-104595>, 6 pages.
"Intents and Intent Filters," Android Developers [online]. [Retrieved on Jun. 24, 2014]. Retrieved from the Internet: http://developer.android.com/guide/components/intents-filters.html, 14 pages.
"Potential Actions," Schema.org [online]. [Retrieved on Jun. 24, 2014]. Retrieved from the Internet: http://schema.org/docs/actions.html, 11 pages.
Office Action issued in Japanese Application No. 2016-574958, dated Feb. 5, 2018, 5 pages (English translation).

\* cited by examiner

INDEXING ACTIONS FOR RESOURCES

CROSS-REFERENCE TO RELATED APPLICATION

This application claims the benefit of U.S. Provisional Application Ser. No. 62/016,469, filed on Jun. 24, 2014, which is incorporated by reference.

BACKGROUND

The Internet provides access to a wide variety of information. For example, digital image files, video and/or audio files, as well as web page resources for particular subjects, are accessible over the Internet. With respect to web page resources, many of these resources are designed to facilitate the performing of particular actions, such as booking restaurant reservations, booking hotel reservations, purchasing tickets, playing videos, shopping, etc. Furthermore, with the advent of tablet computers and smart phones, native application resources that facilitate the performance of the similar functions are now being provided in large numbers. Search engines now also facilitate searching of these resources—both web page and native applications—by crawling and indexing these resources. The content of the resources is typically identified during an indexing process and stored in an index in a manner that facilitates the searching of the content in response to search queries.

One process by which search engines gather information for native applications is by accessing "deep links" for native applications. A deep link is an instruction specifying a particular environment instance of a native application and configured to cause the native application to instantiate the environment instance of the specified native application when selected at a user device. The native application generates the environment instance for display within the native application on a user device. For example, a deep link may specify a selection menu for a game environment; or a particular selection of a song for a music application; or a particular recipe for a cooking application; and the like.

SUMMARY

This specification describes technologies relating to indexing verification of native applications.

In general, one innovative aspect of the subject matter described in this specification can be embodied in methods that include the actions of receiving, for each resource a plurality of resources that are each accessible by a user device, action data describing actions supported by each resource, each action being an action that can be performed by the user device processing the resource; for each resource: determining, from the action data, an action type for each action supported by the resource, determining, from the action data, action parameters for each action supported by the resource, and indexing the action data, action types and action parameters for the resource in an index that is searchable by a search engine. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The system provides a framework for indexing the actions supported by web page resources, web service resources, and native application resources. The system then evaluates queries to determine whether the query is associated with an action, and if so, how well a resource supports that action. This facilitates the surfacing of resources that not only have relevant content for the query, but that can also serve an action that is determined to be responsive to the query. Thus, a search not only focuses on the informational need of the user, but also on the action need of the user, if such action need exists.

The system may facilitate verification of action performance for resources. For instance, only resources that are verified to perform the actions specified for the resources are indicated as being verified. Resources that are not verified are discounted in their ranking with respect to an action score. This eliminates the surfacing of resources that may result in a poor user experience if a user attempts to perform an action using the resource.

In some implementations, by understanding the types of actions, the corresponding constraints, and which resources can satisfy those actions and constraints, a system may present actions to a user in an appropriate context, e.g., to allow a user to make a dinner reservation inside a calendar application as they are scheduling a dinner appointment instead of making the user switch from the calendar application to a dinner reservation application to make the appointment, and then switch back to the calendar application to complete the appointment scheduling. In some implementations, a system may enable applications provided by other systems, e.g., offered by other companies, to perform similar action analysis, action presentation, or both, using the systems index of actions. This may facilitate user actions without having to switch between applications, web pages, or both.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

A system receives action data describing actions performed by resources, and indexes the action data in a searchable index. The index can then be searched to identify resources that enable a user device to perform an action that is responsive to a user input. The user input may be a query or some other command from which an informational need or user intent may be derived. The system can request or supply additional information to help users meet the requirements of the specific action. For example, the system can supply the user's location to a taxi booking application so the application can arrange the taxi pickup at a location near the user. Similarly, the system may prompt a user for a number of people in a party if a user wants to make a dinner reservation. The system can also verify the accuracy of the action data for the resources, and the verifications can be taken into account when scoring, ranking, or both, the resources in response to a query.

These features and additional feature are described in more detail below.

Example Operating Environment

Figure 1:
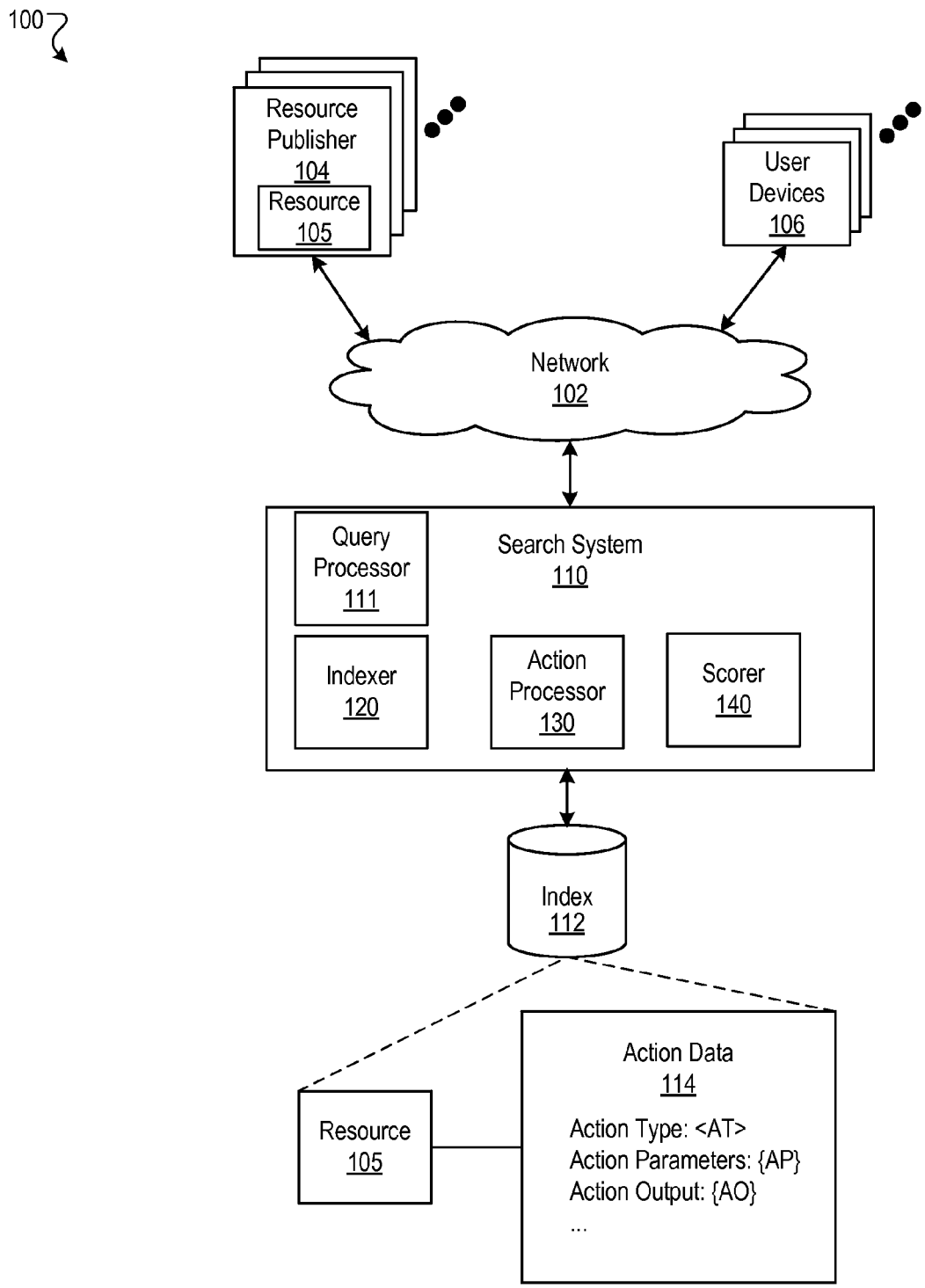
FIG. 1 is a block diagram of an example environment in which actions for resources are verified for indexing and searching.

FIG. 1 is a block diagram of an example environment 100 in which actions for resources are verified for indexing and searching. A computer network 102, such as the Internet, connects publisher web sites 104, user devices 106 and a search system 110.

The publisher websites 104 publish resources 105. The resources include web page resources and native application resources. A publisher website 104 is associated with a domain and hosted by one or more servers in one or more locations. One example publisher website is a collection of web page resources 105 formatted in hypertext markup language (HTML) that can contain text, images, multimedia content, and programming elements.

A web page resource is any data that can be provided by a publisher website 104 over the computer network 102 and that has a resource address, e.g., a uniform resource locator (URL). Web resources may be HTML pages, images files, video files, audio files, and feed sources, to name just a few. The web pages may include embedded information, e.g., meta information and hyperlinks, and/or embedded instructions, e.g., client-side scripts.

Another type of resource publisher is an application publisher that provides native application resources. A native application is specifically designed to run on a particular user device operating system and machine firmware. As used in this specification, an "environment instance" is a display environment within a native application and in which content is displayed, such as text, images, and the like. An environment instance is specific to the particular native application, and the native application is specific to the particular operating system of the user device 106. An environment instance differs from a rendered web resource in that the environment instance is generated within and specific to the native application, while a webpage resource may be rendered in any browser for which the web page resource is compatible, and is independent of the operating system of the user device.

A user device 106 is an electronic device capable of requesting and receiving web page resources and native application resources over the computer network 102. Example user devices 106 include personal computers, mobile communication devices, and tablet computers.

To search resources 105, including both web resources and native applications, the search system 110 accesses a web index 112. The web index 112 is an index of resources 105 that has, for example, been built from crawling the publisher web sites 104 and resources 105.

The user devices 106 submit search queries to the search system 110. In response to each query, the search system 110 accesses the index 112 to identify resources that are relevant to the query. The search system 110 may, for example, identify the resources in the form of web resource search results and native application search results, respectively. Once generated, the search results are provided to the user device 106 from which the query was received.

A web resource search result is data generated by the search system 110 that identifies a web resource and provides information that satisfies a particular search query. A web resource search result for a resource can include a web page title, a snippet of text extracted from the resource, and a resource locator for the resource, e.g., the URL of a web page. A native application search result specifies a native application and may include a "deep link" specifying a particular environment instance of the native application and which is configured to cause the native application to instantiate the specified environmental instance. For example, selection of a native application search result may cause the native application to launch (if installed on the user device 106) and generate an environment instance, e.g., a particular user interface of the native application, referenced in the application search result in the form of a screen shot. For instance, the application search result may include a screen shot that depicts an example of the environment instance and the selection of the native application search result causes the native application to present an interface to the user similar to that shown in the screen shot, e.g., when the differences between the environment instance and the screen shot may be caused by settings associated with the user that may be different than settings for the native application used to create the screen shot.

Indexing Actions for Resources

As described above, users may often desire to have their user devices perform an action, or may be better served with resources that perform particular actions. For example, a user may input a query "Listen to Brandenburg Concertos." The search system 110 can detect, from the query terms, an action specified by the query, namely, playing back a media recording of one or more of the *Brandenburg Concertos* on the user device so that the user can listen to the media. Accordingly, resources that can perform this action will be most useful to the user.

Likewise, a user may desire to make a dinner reservation on a particular evening. The user may utter the command [Make reservation for City Diner for tomorrow evening at seven]. The user device may be operable to convert the speech to text and provide the text to the search system 110. In some examples, the user device may provide the speech to the search system 110, or another system, and the search system converts the speech to text. When another system converts the speech to text, the other system provides the text to the search system 110. The search system 110, in turn, may detect an action specified by the query, namely, making a reservation at the City Diner.

The processing of these inputs to detect a desired action is performed by a query processor 111. The query processor 111 may implement any appropriate query processing algorithm to process the queries to detect actions. For example, the query processor 111 may implement a natural language processor that detects, among other things, action invocations. Likewise, the query processor 111 may implement context free grammars that parse to specific actions with terminals and non-terminals corresponding to the particular actions and arguments for the actions. Other query processing techniques can also be used.

However, while the search system 110 may determine that a particular input may be well served by the performance of an action, the action supported by a resource may not be readily identifiable by the subject matter content of the resource, e.g., when a resource causes an action to occur but does not include a description of the action. Thus the search system 110 processes and indexes action data 114 for resources 105. The action data describes actions supported by each resource, where each action is one that can be performed by the user device processing the resource. The action data is structured data that defines a vocabulary that describes the actions a particular resource enables, how the actions can be invoked, parameters for the actions, and other action-related information. For example, a restaurant application may have an application manifest that includes action data 114 describing actions types <AT> performed by the application, action parameters <AP> or each action type AT, action outputs <AO> for each action type AT, among other action-related features.

One example of action data is implemented in Schema.org Actions. For example, for a web resource 105 for a music playing service Example Player.com, example action data based on the Schema.Org Action vocabulary for a web page from which the *Brandenburg Concertos* may be played may be of the form:

```
{
"@context": "http://schema.org",
"@type": "MusicGroup",
"url": [
    "http://www.example_player.com/Bach",
    "androidapp://com.example_player.android/example_player/Bach ",
    ],
"name": "Brandenburg Concertos",
"potentialAction": {
    "@type": "ListenAction",
    "target": [
        "http://www.example_player com/Bach/listen",
        "androidapp://com.example_player.android/example_player/Bach/listen",
        [
    }
}
```

For a web page, the action data may be provided in mark-up language form. For an application, the action data may be provided as part of an application manifest, or in some other form of metadata. Furthermore, other vocabulary conventions different from the example above can also be used when implementing action data.

Finally, in some implementations, that action data itself may be executable by the user device, and may itself cause the user device to perform the specified action. Thus, the action data need not necessarily be metadata, but can also be data that includes the necessary instructions to cause a user device to perform the action, e.g., the action data may be in the form of a script that the user device can execute.

The action data can be created by the publishers of the resources. For a particular resource, a publisher will define the action type of the action that the resource supports, the content, if any, that is presented by the action, and other features related to the performance of the action. As will be described below, the search system 110 can index the action data, and for each resource can also verify that the action data correctly describes the action performed by the resource.

Figure 2:
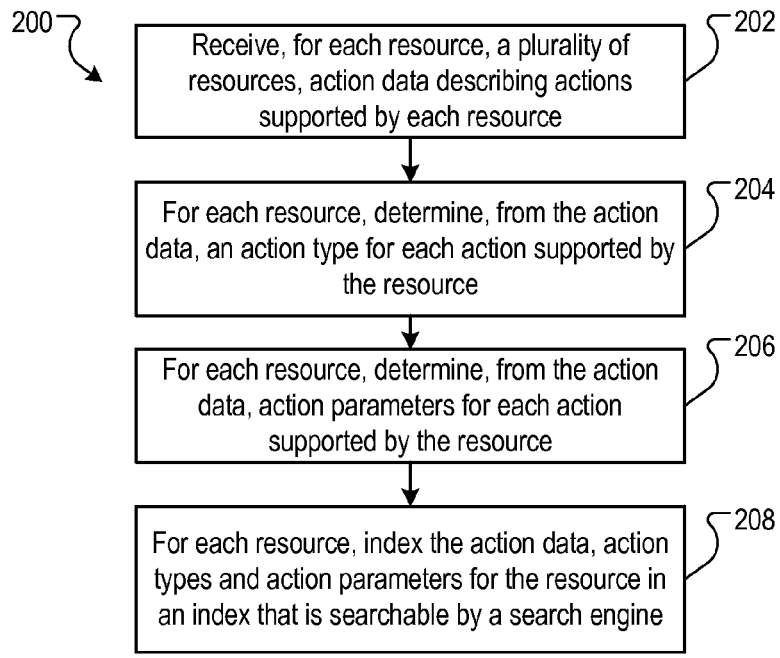
FIG. 2 is a flow diagram of an example process for indexing action data for resources.

FIG. 2 is a flow diagram of an example process 200 for indexing action data for resources. The process 200 can be implemented in the search engine 110. Operation of the process 200 is described with reference to FIG. 1.

The process 200 receives, for each resource a plurality of resources, action data describing actions supported by each resource (202). For example, the search system 110 may be provided the action data during a crawl of resources, or the publishers may submit the action data to the search system along with the corresponding resource.

The process 200, for each resource, determines, from the action data, an action type for each action supported by the resource (204). For example, the indexer 120 processes the action data to identify corresponding action data that defines action types. Examples of action types include a "listen" action, which generates an audio playback; a "watch" action, which generates a video playback, an "install" action, which installs software or performs some other installation process, a "reserve" action which generates a reservation, and so on. Each action type has a corresponding type label according to the action data schema.

The process 200, for each resource, determines, from the action data, action parameters for each action supported by the resource (206). For example, the indexer 120 processes the action data to identify corresponding action parameters listed for each action type, or, if the action parameters are not listed, then accesses an action data schema to determine the parameter types required for the action. To illustrate, the action parameters may include a URL of an audio file if the "listen" action is an auto play action. Likewise, for a "reserve" action, the parameters may include a URL of a reservation service, a number of people, a name for the reservation, a date, and a time.

The process 200, for each resource, indexes the action data, action types and action parameters for the resource in an index that is searchable by a search engine (208). For example, the indexer 112 stores the action data, indexed by one or more keys, in association with other data that is indexed for the resource 112, as graphically depicted in FIG. 1. Any appropriate indexing process and schema can be used to index the action data 114.

Verifying Resource Actions

In some implementations, the search system 110 verifies the accuracy of the action data for a resource. Unlike subject matter content of a resource, which does not itself perform an action, the behavior of a user device, or a virtual emulation of a user device, must be observed to verify that the action performed by the resource is consistent with the action data that describes the action, and that the action performs correctly.

Figure 3:
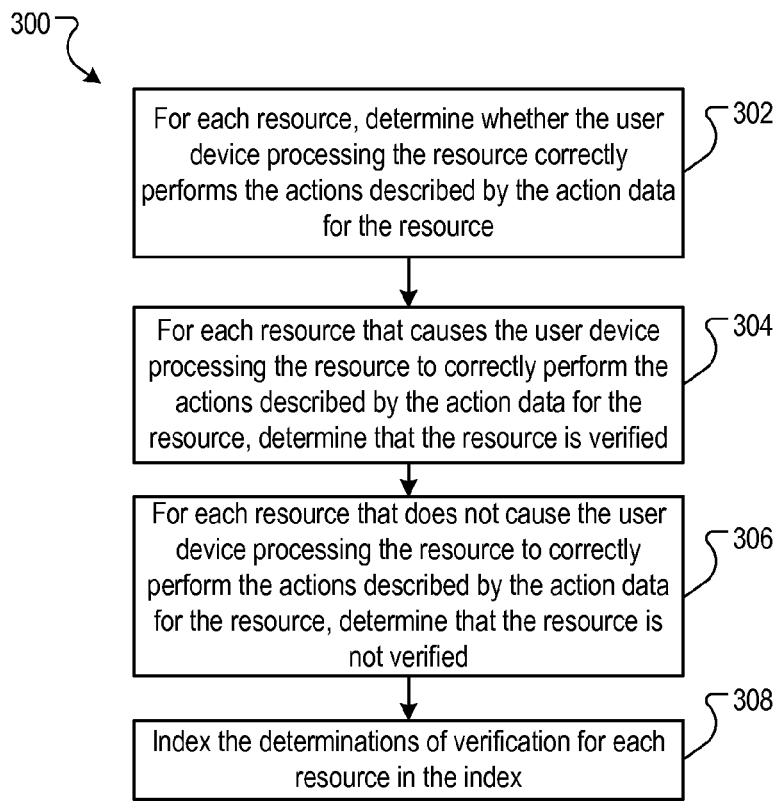
FIG. 3 is a flow diagram of an example process for verifying actions of resources.

One example process of verifying actions is described with reference to FIG. 3, which is a flow diagram of an example process 300 for verifying actions of resources. The process 300 can be implemented in the search engine 110, such as by an action processor 130. The action processor 130 may be a data processing apparatus of one or more computers in data communication, and run an operating system emulator that emulates an operating system on which applications are to be executed and web pages are to be rendered and processed. In addition to verifying invocation of an action, the process 300 can also verify that the action performs correctly and without errors. Any appropriate instrumentation and corresponding handlers to monitor for errors, timeouts, and other conditions and signals that are indicative of actions failures or errors can be used to realize the operations described below.

The process 300, for each resource, determines whether the user device processing the resource correctly performs the actions described by the action data for the resource (302). For example, the action processor 130 may monitor for instantiation and performance failures. This may include determining whether resource causes an instantiation failure on the user device, such as causing the user device to crash, or causing an application to crash or freeze, etc. Likewise, timeouts and link failures may also be interpreted as an instantiation failure. For example, action data for a resource may indicate the resource will cause the user device to playback a particular recording; however, if the user device sends a request for the file or data of the recording and a timeout occurs, or the address to which the request is to be sent cannot be resolved, then an instantiation failure is determined. Otherwise, the action processor 130 determines that the resource causes the user device to perform the action successfully.

The process 300, for each resource that causes the user device processing the resource to correctly perform the actions described by the action data for the resource, determines that the resource is verified (304). Conversely, for each resource that does not cause the user device processing the resource to correctly perform the actions described by the action data for the resource, the process 300 determines that the resource is not verified (306).

The process 300 indexes the determinations of verification for each resource in the index (308). The verification data for a resource, in some implementations, can be used to determine whether the resource is eligible to be ranked, in part, based on the resource's ability to support an action. In some implementations, only resources that are verified may be ranked, in part, based on the action data. Other operations, such as automatically launching an application to perform an action, or automatically performing an action in response to selection of a search result linking to the resource, may be subject to a positive verification.

Even if a user device does perform an action, the action processor 130 may perform additional checks for verification. These additional checks may involve verifying that the action performs the operations associated with its type, and that any specified outputs are correctly generated. For example, if an action is specified as a "watch" action, but a "listen" action is performed instead, the resource may not be verified, even if the listen action is performed without error. This is because the observed action type—"listen"—does not match the specified action type—"watch."

Figure 4:
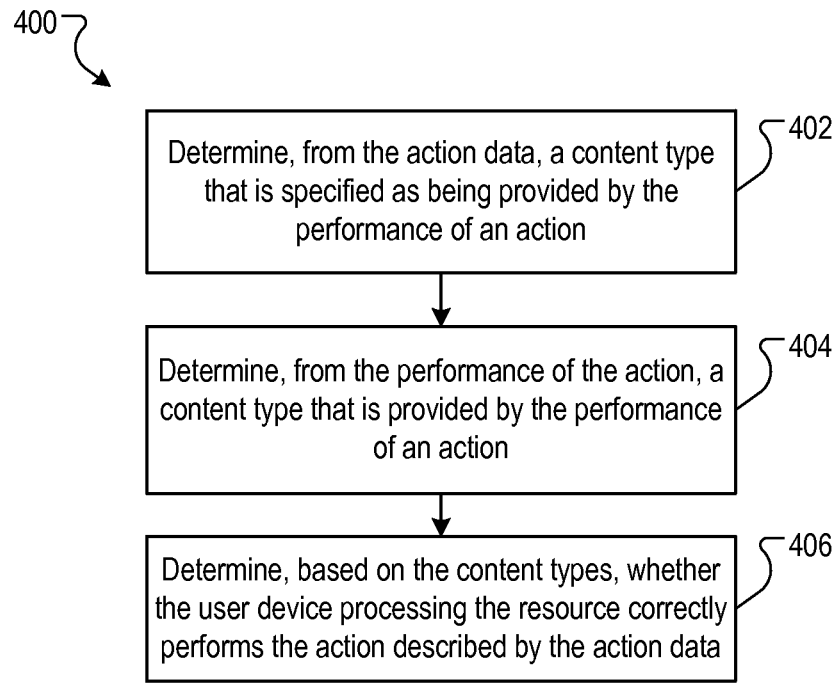
FIG. 4 is a flow diagram of verifying actions for a resource based on content type.

Action type matches between the specified action type and the observed action type are but one example action verification. Another type of verification is a content match, described with reference to the process 400 of FIG. 4. The process 400 can be implemented in the search engine 110, such as by the action processor 130.

The process 400 determines, from the action data, a content type that is specified as being provided by the performance of an action (402). For example, the content type can, in some implementations, specify whether the content is audio, video, or some other type of content. In variations of these implementations, the content type can be more specific, such as specifying the subject matter of the content, e.g., a particular artist, a particular program, or a particular file.

The process 400 determines, from the performance of the action, a content type that is provided by the performance of an action (404). For example, the action processor 130 may receive metadata describing the content type provided and compare the metadata to the content type specified by the action data.

The process 400 determines, based on the content types, whether the user device processing the resource correctly performs the action described by the action data (406). For example, if the content types, the requested content, or both, match, the action processor 130 determines the user device processing the resource correctly performs the action described by the action data. Conversely, if the content types, the requested context, or both, do not match, then the action processor 130 determines the user device processing the resource does not correctly perform the action described by the action data.

Ranking Resources Based on Actions

Figure 5:
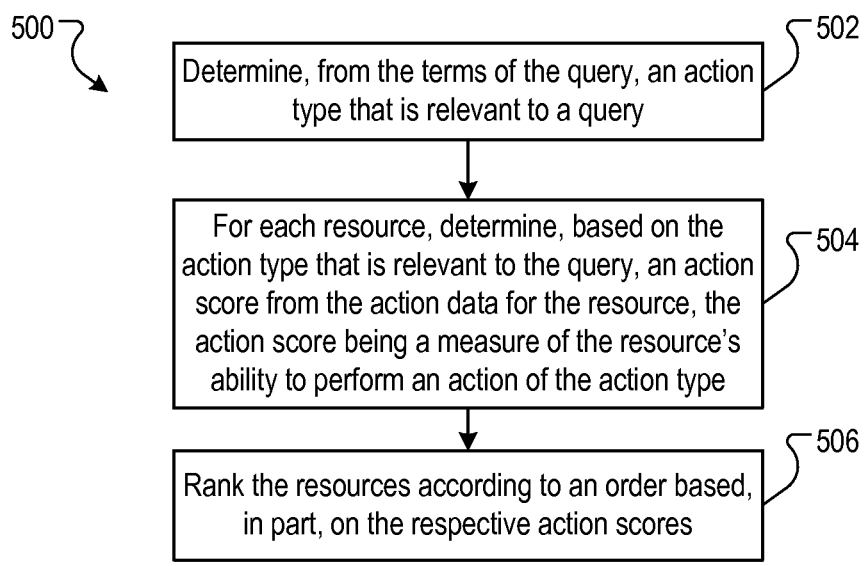
FIG. 5 is a flow diagram of an example process for ranking resources based on action types.

Once the resources and action data are indexed in the index 112, the resources that are verified may be ranked, in part, on the actions they perform. This allows for the search system 110 to surface resources that perform particular actions in situations in which performance of an action may highly satisfy a user's need, e.g., in which performance of an action has a high probability of satisfying the user's need associated with a search query. FIG. 5 is a flow diagram of an example process 500 for ranking resources based on action types. The process 500 can be implemented in the search engine 110.

The process 500 determines, from the terms of the query, an action type that is relevant to a query (502). As described above, the query may be input into a search interface, and the search system 110 may have a query processor 111 that associates actions with particular query language from the query. In other situations, a process or service may generate a query based on a command from which a user intent may be derived, e.g., the user may speak the command [Make reservation for City Diner for tomorrow evening at seven].

The process 500, for each resource, determines, based on the action type that is relevant to the query, an action score from the action data for the resource where the action score is a measure of the resource's ability to perform an action of the action type (504). For example, the action scorer 140 scores each validated resource. In some implementations, the action score may be a binary score, where a first value indicates the resource performs an action of the action type, and a second value indicates the resource does not perform an action of the action type. In other implementations, the action score may be a continuous score within an upper and lower bound, and the higher the action score is, the higher the ability of the resource to perform the action type.

The ability of a resource to perform an action may be based, in part, on the steps required for the user to invoke the action. For example, a resource that requires no input from a user to perform an action may have a higher action score than a resource that requires user confirmation, or user information, to perform the action.

The action score may also be query dependent. For example, action parameters for the action type required to perform an action of the action type may be determined for each resource that corresponds to the action type. Likewise, parameter values that match the action parameters for the action type are also determined. The action score may then be based on the number of parameter values in the query that match the action parameters of the action type, and the number of parameter values missing from the query that match the action parameters for the action type. For example, a resource that requires only the parameter specified in the query to perform a particular action may have a higher action score than a resource that requires the parameter values specified in the query and additional parameter values to perform the action.

The process 500 ranks the resources according to an order based, in part, on the respective action scores (506). The overall ranking of the resources may take into account factors such as authority of each of the resource, quality of the resources, etc. For resources that have action scores, the action scores can also be considered when ranking the resources.

Additional Implementation Details

Figure 6:
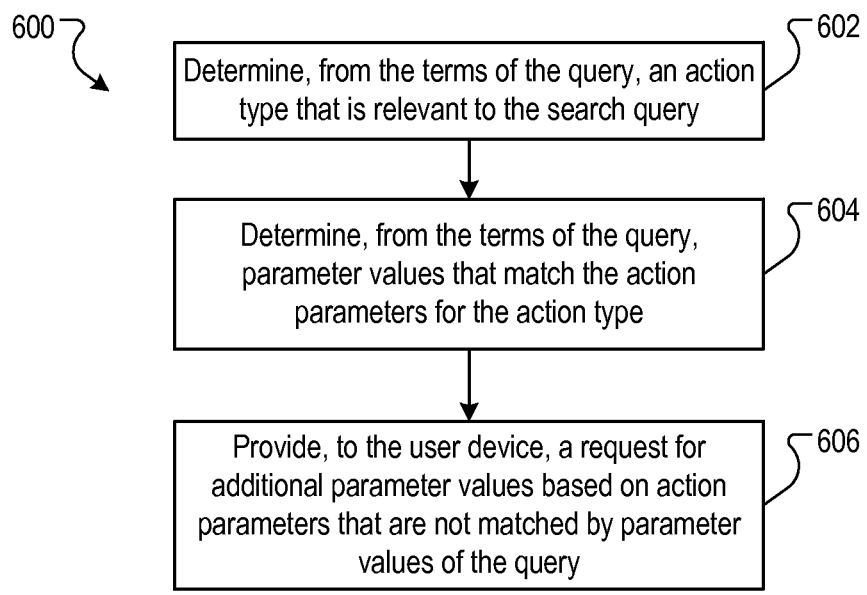
FIG. 6 is a flow diagram of an example process for assisting a user for invocation of an action using a resource.

In some implementations, the action data can be used to assist the user in providing information, such as action parameter values, for invocation of an action using a resource. FIG. 6 is a flow diagram of an example process 600 for assisting a user for invocation of an action using a resource. The process 600 can be implemented in the search engine 110.

The process 600 determines, from the terms of the query, an action type that is relevant to the search query (602). This step is similar to step 502 above. For example, for the command [Make reservation for City Diner for tomorrow evening at seven], the action type may be "reserve."

The process 600 determines, from the terms of the query, parameter values that match the action parameters for the action type (604). For example, the query processor 111, or the action scorer 140, may determine from the query the parameter values that are required to perform the action of the action type. For example, for the action type "reserve," the parameter values of "restaurant name," "party name," "number of guests," "date" and "time" may be required. In this example, the parameter values that match the parameter types are "City Diner" for "restaurant name," "tomorrow" for "date," and "evening, seven" for "time." The missing parameter values are "number of guests" and "party name."

The process 600 provides to the user device a request for additional parameter values based on action parameters that are not matched by parameter values of the query (606). For example, action scorer 140 may send a request to the user device 106 for the number of guests and the party name. To illustrate, the user device may display the message "I can try to make you a reservation at the City Diner for tomorrow at 7:00 PM, but I'll need the party name and the number of guests. Can you tell me the party name and the number of guests?" The user device will then be in an input mode to receive the data, either in the form of a voice input or touch input, for example.

In variations of this implementation, some parameter data may be provided automatically if, for example, parameter values are available. For example, when booking a taxi, a user's location may be provided automatically. Likewise, when booking a reservation, the user's name may be provided automatically.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:

receiving, for each resource of a plurality of resources that are each accessible by a user device and are each responsive to at least a respective search query, action data describing one or more computer actions supported by the respective resource, each computer action being an action that can be performed by the user device processing the resource, wherein:

the resources include web page resources and native application resources; and a native application resource is a resource for a native application designed to execute on a particular device operating system;

in response to receiving the action data for each resource of the plurality of resources, for each resource:

determining, for each of the one or more computer actions supported by the resource using the action data, a computer action type from multiple different predetermined computer action types that each specify one or more action parameter values required to enable the user device to perform computer actions of the respective action type;

determining, for each of the one or more computer actions supported by the resource using the action data, one or more action parameters for which corresponding parameter values are required to enable the user device to perform the respective computer action; and in response to determining the computer action type and the one or more action parameters, indexing the action data, the one or more computer action types and the one or more action parameters for the resource in an index that is searchable by a search engine that determines search results responsive to a search query;

receiving, from a user device, a query that includes one or more terms;

determining, using the terms of the query, a computer action type from the multiple different predetermined computer action types that is relevant to the query;

determining, for each resource of a plurality of resources that are each responsive to the query, an action score using the computer action type that is relevant to the query and the action data for the resource stored in the index, the action score being a measure of the resource's ability to perform an action of the computer action type that is relevant to the query;

ranking the resources in the plurality of resources according to an order based, in part, on the respective action scores; and providing data for at least one of one or more highest ranked resources from the plurality of resources to the user device to enable the user device to perform an action for the at least one of the ranked resources.

2. The computer-implemented method of claim 1, further comprising:

for each resource, determining whether a user device processing the resource correctly performs the computer actions described by the action data for the resource;

for each resource that causes the user device processing the resource to correctly perform the computer actions described by the action data for the resource, determining that the resource is verified;

for each resource that does not cause the user device processing the resource to correctly perform the computer actions described by the action data for the resource, determining that the resource is not verified;

indexing, for each resource, the determination of verification for the resource in the index and associated with the action data, the one or more computer action types, and the one or more action parameters for the resource.

3. The computer-implemented method of claim 2, wherein determining whether the user device processing the resource correctly performs the computer actions described by the action data for the resource comprises:

for each computer action from the one or more computer actions:
 determining whether the resource causes an instantiation failure on the user device, and
 determining that a resource that causes an instantiation failure does not cause the user device processing the resource to correctly perform the computer action described by the action data for the resource.

4. The computer-implemented method of claim 2, wherein determining whether the user device processing the resource correctly performs the computer actions described by the action data for the resource comprises:

for each computer action from the one or more computer actions:
 determining, from the action data, a content type that is specified as being provided by the performance of an action;
 determining, from the performance of the computer action, a content type that is provided by the performance of an action; and
 determining that the user device processing the resource correctly performs the computer action described by the action data only when content type that is specified as being provided by the performance of an action matches the content type that is provided by the performance of an action.

5. The method of claim 1, wherein:
determining, using the terms of the query, the computer action type that is relevant to the query comprises:
 determining, for each resource of the plurality of resources, action parameters for the computer action type required to perform an action of the computer action type;
 determining, from the terms of the query, parameter values that match the action parameters for the computer action type; and
determining an action score from the action data for the resource comprises determining the action score based on the parameter values that match the action parameters for the computer action type.

6. The computer-implemented method of claim 1, wherein the query is received in response to being input to a search engine resource on a user device.

7. The computer-implemented method of claim 1, wherein the query is received in response to being input on a calendar application on a user device.

8. The computer-implemented method of claim 1, further comprising:
in response to determining the computer action type from the multiple different predetermined computer action types that is relevant to the query, determining, from the terms of the query, parameter values that match the action parameters for the computer action type that is relevant to the query; and
providing, to the user device, a request for additional parameter values based on action parameters that are not matched by parameter values of the query.

9. A system, comprising:
a data processing apparatus; and
software stored in a non-transitory computer readable storage medium storing instructions executable by the data processing apparatus and that upon such execution cause the data processing apparatus to perform operations comprising:
 receiving, for each resource a plurality of resources that are each accessible by a user device and are each responsive to at least a respective search query, action data describing one or more computer actions supported by the respective resource, each computer action being an action that can be performed by the user device processing the resource, wherein:
  the resources include web page resources and native application resources; and
  a native application resource is a resource for a native application designed to execute on a particular device operating system;
 in response to receiving the action data for each resource of the plurality of resources, for each resource:
  determining, for each of the one or more computer actions supported by the resource using the action data, a computer action type from multiple different predetermined computer action types that each require one or more action parameter values to enable the user device to perform computer actions of the respective action type;
  determining, for each of the one or more computer actions supported by the resource using the action data, one or more action parameters for which corresponding parameter values are required to enable the user device to perform the respective computer action; and in response to determining the computer action type and the one or more action parameters, indexing the action data, the one or more computer action types and the one or more action parameters for the resource in an index that is searchable by a search engine that determines search results responsive to a search query;

receiving, from a user device, a query that includes one or more terms;

determining, using the terms of the query, a computer action type from the multiple different predetermined computer action types that is relevant to the query;

determining, for each resource of a plurality of resources that are each responsive to the query, an action score using the computer action type that is relevant to the query and the action data for the resource stored in the index, the action score being a measure of the resource's ability to perform an action of the computer action type that is relevant to the query;

ranking the resources in the plurality of resources according to an order based, in part, on the respective action scores; and providing data for at least one of one or more highest ranked resources from the plurality of resources to the user device to enable the user device to perform an action for the at least one of the ranked resources.

10. The system of claim 9, the operations further comprising:

for each resource, determining whether a user device processing the resource correctly performs the computer actions described by the action data for the resource;

for each resource that causes the user device processing the resource to correctly perform the computer actions described by the action data for the resource, determining that the resource is verified;

for each resource that does not cause the user device processing the resource to correctly perform the computer actions described by the action data for the resource, determining that the resource is not verified;

indexing, for each resource, the determination of verification for the resource in the index and associated with the action data, the one or more computer action types, and the one or more action parameters for the resource.

11. The system of claim 10, wherein determining whether the user device processing the resource correctly performs the computer actions described by the action data for the resource comprises:

for each computer action from the one or more computer actions:
determining whether resource causes an instantiation failure on the user device, and
determining that a resource that causes an instantiation failure does not cause the user device processing the resource to correctly perform the computer action described by the action data for the resource.

12. The system of claim 10, wherein determining whether the user device processing the resource correctly performs the computer actions described by the action data for the resource comprises:

for each computer action from the one or more computer actions:
determining, from the action data, a content type that is specified as being provided by the performance of an action;

determining, from the performance of the computer action, a content type that is provided by the performance of an action; and determining that the user device processing the resource correctly performs the computer action described by the action data only when content type that is specified as being provided by the performance of an action matches the content type that is provided by the performance of an action.

13. The system of claim 9, wherein:

determining, using the terms of the query, the computer action type that is relevant to the query comprises:
determining, for each resource of the plurality of resources, action parameters for the computer action type required to perform an action of the computer action type;
determining, from the terms of the query, parameter values that match the action parameters for the computer action type; and
determining an action score from the action data for the resource comprises determining the action score based on the parameter values that match the action parameters for the computer action type.

14. The system of claim 9, wherein the query is received in response to being input to a search engine resource on a user device.

15. The system of claim 9, wherein the query is received in response to being input on a calendar application on a user device.

16. The system of claim 9, further comprising:

in response to determining the computer action type from the multiple different predetermined computer action types that is relevant to the query, determining, from the terms of the query, parameter values that match the action parameters for the computer action type that is relevant to the query; and providing, to the user device, a request for additional parameter values based on action parameters that are not matched by parameter values of the query.

17. A non-transitory computer readable storage medium storing instructions executable by a data processing apparatus and that upon such execution cause the data processing apparatus to perform operations comprising:

receiving, for each resource a plurality of resources that are each accessible by a user device and are each responsive to at least a respective search query, action data describing one or more computer actions supported by the respective resource, each computer action being an action that can be performed by the user device processing the resource, wherein:
the resources include web page resources and native application resources; and
a native application resource is a resource for a native application designed to execute on a particular device operating system;

in response to receiving the action data for each resource of the plurality of resources, for each resource:
determining, for each of the one or more computer actions supported by the resource using the action data, a computer action type from multiple different predetermined computer action types that each require one or more action parameter values to enable the user device to perform computer actions of the respective action type;
determining, for each of the one or more computer actions supported by the resource using the action data, one or more action parameters for which corresponding parameter values are required to enable the user device to perform the respective computer action; and in response to determining the computer action type and the one or more action parameters, indexing the action data, the one or more computer action types and the one or more action parameters for the resource in an index that is searchable by a search engine that determines search results responsive to a search query;

receiving, from a user device, a query that includes one or more terms;

determining, using the terms of the query, a computer action type from the multiple different predetermined computer action types that is relevant to the query;

determining, for each resource of a plurality of resources that are each responsive to the query, an action score using the computer action type that is relevant to the query and the action data for the resource stored in the index, the action score being a measure of the resource's ability to perform an action of the computer action type that is relevant to the query;

ranking the resources in the plurality of resources according to an order based, in part, on the respective action scores; and providing data for at least one of one or more highest ranked resources from the plurality of resources to the user device to enable the user device to perform an action for the at least one of the ranked resources.

18. The computer readable storage medium of claim 17, the operations further comprising:

for each resource, determining whether a user device processing the resource correctly performs the computer actions described by the action data for the resource;

for each resource that causes the user device processing the resource to correctly perform the computer actions described by the action data for the resource, determining that the resource is verified;

for each resource that does not cause the user device processing the resource to correctly perform the computer actions described by the action data for the resource, determining that the resource is not verified;

indexing, for each resource, the determination of verification for the resource in the index and associated with the action data, the one or more computer action types, and the one or more action parameters for the resource.

19. The computer readable storage medium of claim 18, wherein determining whether the user device processing the resource correctly performs the computer actions described by the action data for the resource comprises:

for each computer action from the one or more computer actions:

determining whether resource causes an instantiation failure on the user device, and determining that a resource that causes an instantiation failure does not cause the user device processing the resource to correctly perform the computer action described by the action data for the resource.

20. The computer readable storage medium of claim 18, wherein determining whether the user device processing the resource correctly performs the computer actions described by the action data for the resource comprises:

for each computer action from the one or more computer actions:

determining, from the action data, a content type that is specified as being provided by the performance of an action;

determining, from the performance of the computer action, a content type that is provided by the performance of an action; and determining that the user device processing the resource correctly performs the computer action described by the action data only when content type that is specified as being provided by the performance of an action matches the content type that is provided by the performance of an action.

21. The computer readable storage medium of claim 17, wherein:

determining, using the terms of the query, the computer action type that is relevant to the query comprises:

determining, for each resource of the plurality of resources, action parameters for the computer action type required to perform an action of the computer action type;

determining, from the terms of the query, parameter values that match the action parameters for the computer action type; and determining an action score from the action data for the resource comprises determining the action score based on the parameter values that match the action parameters for the computer action type.

* * * * *